United States Patent [19]

Nakano et al.

[11] 3,994,270
[45] Nov. 30, 1976

[54] MANIFOLD SYSTEM FOR AN INTERNAL COMBUSTION ENGINE

[75] Inventors: Soichi Nakano, Kawagoe; Akira Ishizuya, Wako, both of Japan

[73] Assignee: Honda Giken Kogyo Kabushiki Kaisha, Tokyo, Japan

[22] Filed: Mar. 12, 1975

[21] Appl. No.: 557,513

Related U.S. Application Data

[63] Continuation-in-part of Ser. No. 383,983, July 30, 1973, abandoned, and a continuation of Ser. No. 412,662, Nov. 5, 1973, abandoned.

[52] U.S. Cl. ............................ 123/122 AB; 60/282; 60/322; 123/32 SP; 123/52 M; 123/122 AC
[51] Int. Cl.² ....................................... F02B 19/10
[58] Field of Search .......... 123/32 ST, 32 SP, 52 M, 123/75 B, 122 A, 122 AB, 122 AC; 60/322, 282; 165/52

[56] References Cited
UNITED STATES PATENTS

| | | | |
|---|---|---|---|
| 2,199,059 | 4/1940 | Weir | 123/52 M |
| 2,244,214 | 6/1941 | Pescara | 123/75 B X |
| 2,503,071 | 4/1950 | Scherger | 123/52 M |
| 3,659,564 | 5/1972 | Suzuki et al. | 123/32 ST X |
| 3,703,083 | 11/1972 | Tadokoro | 60/322 |
| 3,724,218 | 4/1973 | Cole | 60/282 |
| 3,892,212 | 7/1975 | Tamai et al. | 123/122 AB |
| 3,895,617 | 7/1975 | Sakurai | 123/122 AB |

*Primary Examiner*—Charles J. Myhre
*Assistant Examiner*—Tony M. Argenbright
*Attorney, Agent, or Firm*—Lyon & Lyon

[57] ABSTRACT

An intake and exhaust system for an internal combustion engine of the type having an auxiliary combustion chamber associated with each main combustion chamber, and wherein the overall air-fuel charge to all combustion chambers is leaner than the stoichiometric ratio, so that excess air is present in the exhaust gases. The system includes integrated intake manifolds, one for connection with the main combustion chamber and the other for connection with the auxiliary combustion chamber, and an exhaust manifold for connection with the main combustion chambers. The exhaust manifold includes a stainless steel liner enveloped within and spaced from a metal casting in order to retain the heat of the exhaust gases so that the exhaust gas temperature remains at or above the temperature at which the unburned hydrocarbons in the exhaust gases will continue to burn. This temperature also promotes oxidation of carbon monoxide to carbon dioxide. The intake manifold is in thermal association with the exhaust manifold to provide a transfer of heat from the exhaust manifold to the intake manifold so that a rich mixture for the auxiliary combustion chambers and a lean mixture for the main combustion chambers are both heated in a controlled ratio. An integral heat riser member is positioned between the exhaust manifold and the intake manifold for transferring heat therebetween. The liner has a collection chamber with a baffle located therein to direct the flow of exhaust gases to insure proper heat transfer to the riser member. Another main feature of the system is to present a minimum heat capacity in association with the exhausting gases to allow the overall system to quickly achieve preferred operating conditions.

5 Claims, 5 Drawing Figures

MANIFOLD SYSTEM FOR AN INTERNAL COMBUSTION ENGINE

This application is a Continuation-in-Part of the copending application of Soichi Nakano and Akiro Ishizuya filed July 30, 1973, Ser. No. 383,983, now abandoned and entitled "Manifold System for an Internal Combustion Engine". This is a continuation of application Ser. No. 412,662, filed Nov. 5, 1973 now abandoned This invention is directed to a manifold system to be used with an internal combustion engine of the type wherein an auxiliary combustion chamber is associated with each main combustion chamber and the overall air-fuel charge to all combustion chambers of the engine is leaner than the stoichiometric air-fuel ratio. More specifically, this invention is directed to a manifold system wherein the temperature of the exhaust gases passing through the manifold system is maintained at or above the reaction temperature for hydrocarbons and carbon monoxide with oxygen, and heat is transferred from the exhaust manifold to the intake manifold to insure vaporization of the air-fuel mixture.

Internal combustion engines of the type having an auxiliary combustion chamber associated with each main combustion chamber have been found to be adaptable to provide a relatively clean exhaust. Such engines have been supplied with a leaner than stoichiometric air-fuel ratio which makes available excess oxygen in the exhaust. A rich air-fuel mixture is directed to the small auxiliary combustion chambers and a lean air-fuel mixture is directed to the large main combustion chambers. After compression, a spark plug in each auxiliary chamber ignites the mixture therein to send a flame into the adjacent main combustion chamber through a torch nozzle, to burn the lean mixture. The burning gases are then exhausted from the engine. These burning gases include excess oxygen remaining after the burning of the lean air-fuel mixture.

It has been known that the burning of both the rich air-fuel mixture and the lean air-fuel mixture can be improved by elevating the temperatures of the incoming mixtures in order that the atomized fuel will become completely vaporized before ignition. This improvement in the quality of the air-fuel mixtures improves the combustion of the gases within the auxiliary and main combustion chambers. This results in a cleaner exhaust.

It has been a common practice to inject additional air into the hot exhausting gases from internal combustion engines in order that a major portion of the hydrocarbons may be oxidized to form carbon dioxide and water. However, the relatively cold additional air reduces the temperature of the exhaust gases below an acceptable level. This invention contemplates that no additional air be injected into the hot exhaust gases. Instead, the necessary reaction of the unburned hydrocarbons is caused to continue by maintaining the temperature of the exhausting gases at or above the temperature at which the hydrocarbons will react with the excess oxygen. Moreover, the longer the exhaust gases are held above this critical temperature where excess oxygen is present, the more unburned hydrocarbons will be converted to carbon dioxide and water.

The present invention employs these principles in association with engines of the above type to provide optimum mixture quality and maximum conversion of the unburned hydrocarbons within the exhaust gases. In this way, a clean burning internal combustion engine is provided without additional air pumps, or catalytic converters and the like. The present manifold system directs both rich and lean intake mixtures to the engine and collects the exhaust gases. As the air-fuel mixtures move through passages in the intake manifold to the engine, the mixtures are preconditioned by the manifold system by heat transfer between the exhaust and intake manifolds. The heat transfer to the intake manifold from the exhaust manifold serves to maintain the entire riser area of the intake manifold at substantially the same temperature so that both the lean mixture and the rich mixture are heated proportionately. Proportionate heating of the two mixtures is maintained regardless of variations in the operating conditions of the engine. This conditioning process of the intake mixtures is quickly achieved after cold starting of the engine because of the novel design which substantially reduces the heat capacity of the system. Further, the overall quantity of heat transmitted between the exhaust manifold and the intake manifold across the entire range of operating conditions varies with these conditions to produce a substantially constant temperature to which the intake mixtures are exposed. Thus, the quality of the conditioned intake mixtures is maintained across all operating conditions under which the engine must perform, from cold start to continuous high speed operation.

The condition of the exhaust gases themselves are also improved by the present invention. The exhausting gases are hot enough to sustain the burning of the hydrocarbons in the presence of oxygen. Because the overall ratio of the air-fuel mixtures is leaner than stoichiometric, the resulting exhaust gases include excess oxygen. The exhaust manifold provides for the retention of the exhaust heat within the gases to keep the temperature thereof at or above the temperature required for reaction of the hydrocarbons with the oxygen. Additional heat is generated in the exhaust manifold by this reaction.

Thus, two separate sources of heat are utilized: (a) the heat of the exhaust gases delivered into the liner, and (b) the additional heat generated within the liner by the reaction of the excess oxygen with the unburned hydrocarbons. The additional heat developed is particularly important under light load conditions, because there is greater flow and hence more heat in the exhaust gases under heavy load. Heat retention is accomplished by reducing heat transfer from the exhaust manifold at all points therein except for the location where heat transfer is promoted between the exhaust manifold and the intake manifold. Thus, the burning of the hydrocarbons will continue for a sufficient period of time to result in cleaner emissions, and maximum use is made of the heat contained within the exhaust gases. Thus, the heat energy within the exhaust gases is employed to (a) sustain the reaction between the unburned hydrocarbons and the excess oxygen, (b) promote the oxidation of CO to $CO_2$, and (c) insure vaporization of the air-fuel mixtures within the intake manifold.

Accordingly, it is an object of the present invention to provide a manifold system for an internal combustion engine wherein the exhaust gases are maintained above the minimum reaction temperature necessary for burning hydrocarbons and promote oxidizing CO to $CO_2$, and at the same time improve the mixture quality of the incoming air-fuel mixtures. Another object of the present invention is to provide a manifold system for an internal combustion engine wherein these three conditions are quickly achieved after cold start.

A further object of the present invention is to provide a manifold system for an internal combustion engine wherein the relative temperatures between the portion of a riser member in association with the auxiliary manifold and a portion of the riser member in association with the main manifold remain equal regardless of the load placed on the engine.

Another object of the present invention is to provide a constant temperature across a heat riser member between the exhaust manifold and the intake manifold regardless of the operating conditions of the engine.

Other and more detailed objects and advantages will appear hereinafter. In the drawings:

Figure 1:
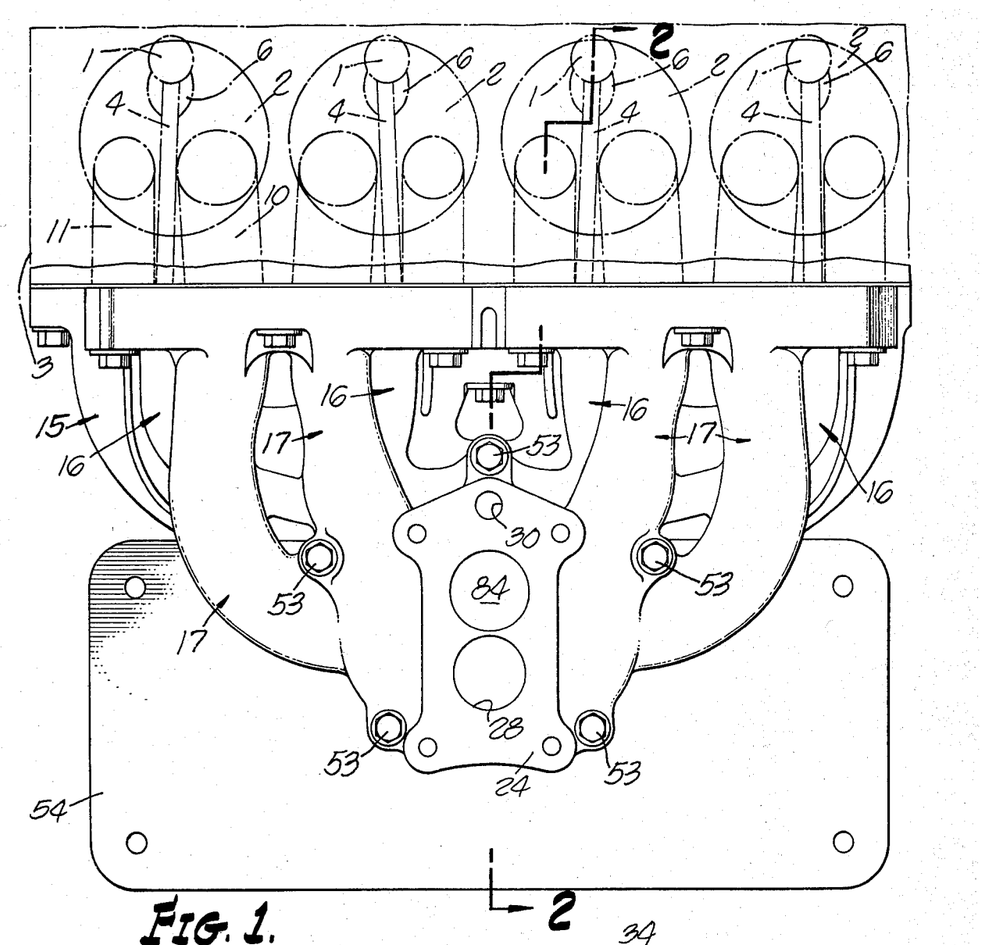
FIG. 1 is a plan view of the assembled manifold system.
Figure 2:
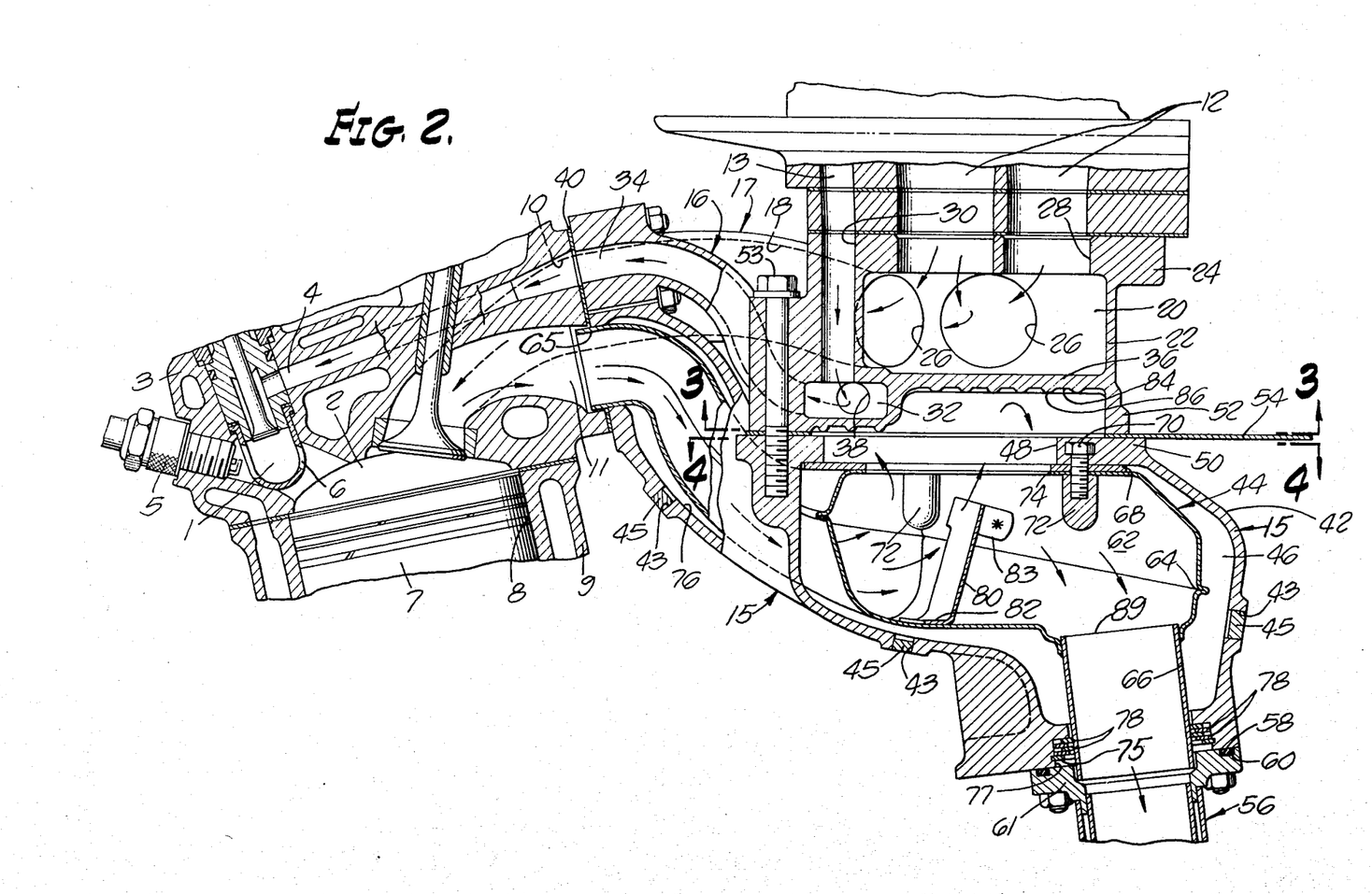
FIG. 2 is a sectional view of the assembled manifold system taken along line 2—2 of FIG. 1.

Referring specifically to the drawings, a manifold system for an internal combustion engine is disclosed. The type of engine for which the present manifold system is designed includes a combustion chamber system having an auxiliary combustion chamber 1 associated with each main combustion chamber 2. A portion of such an engine is shown in FIG. 2. Within the engine head 3 valved intake passages 4 lead to the auxiliary combustion chambers 1. A spark plug 5 is associated with each of the auxiliary combustion chambers 1, and a restricted passageway or torch nozzle 6 connects each auxiliary combustion chamber 1 to its respective main combustion chamber 2. The main combustion chambers 2 are conventionally defined with a moving wall provided by a piston 7 located within a cylindrical cavity 8 formed in an engine block 9. Valved intake passages 10 and valved exhaust passages 11 are connected to each main combustion chamber 2 and are also located within the head 3.

During the suction stroke of the piston 7 a rich air-fuel mixture is drawn into the auxiliary combustion chamber 1 and a lean air-fuel mixture is drawn into the main combustion chamber 2. After compression, the mixture in the auxiliary chamber 1 is ignited by spark plug 5. The burning mixture is then forced by virtue of its own expansion through the torch nozzle 6 into the main combustion chamber 2 where it ignites the lean air-fuel mixture. Following the power stroke, the gases are exhausted through passage 11. As the exhaust gases leave the main combustion chamber 2, they are at a temperature which is above the minimum temperature required for the reaction of the unburned hydrocarbons (HC) and carbon monoxide (CO) with oxygen. Further, the overall air-fuel ratio of the intake mixtures is such that excess oxygen remains in the exhaust as it leaves the main combustion chambers 2. Consequently, the burning of HC and the oxidation of CO continue as the exhaust gases leave the engine and enter the exhaust manifold.

Also contemplated to work in association with the manifold system of the present invention is a carburetion system which produces two different air-fuel mixtures. The main carburetor assembly 12 provides a lean air-fuel mixture which is drawn into the main combustion chambers 2 of the engine. An auxiliary carburetor assembly 13 is employed to produce a rich air-fuel mixture for the auxiliary combustion chambers 1. The disclosed embodiment of the manifold system of this invention is shown in association with the carburetor assemblies 12 and 13, the engine head 3, in which are located the main and auxiliary combustion chambers 2 and 1, and an exhaust pipe system 56. The disclosed embodiment of this invention relates to a manifold system associated with a two liter, four cylinder engine. However, the principles disclosed herein may be incorporated with engines having other displacements and numbers of cylinders, including single cylinder engines.

The manifold system has two main components, the intake manifold 14 and the exhaust manifold 15. The intake manifold 14 is divided into a main intake section 17 and an auxiliary intake section 16. In the present embodiment, the main intake section 17 and the auxiliary intake section 16 are constructed from a single casting. Such construction reduces costs and lends itself to mass production techniques. The main intake section 17 includes four main intake passageways 18, each connected to a valved intake passage 1 in the head 3 leading to a main combustion chamber 2.

The main intake section 17 contains a main intake chamber 20 from which the main intake passageways 18 extend.

The main intake chamber 20 is defined within a peripheral side wall 22, an upper adapter flange 24, and a riser member 84. Ports 26 are provided through the sidewall 22 of the main intake chamber 20 to provide communication between the main intake chamber 20 and the main intake passageways 18. The adapter flange 24 provides a mounting surface for the carburetor assemblies and includes intake ports 28 to establish communication between the carburetor assembly 12 and the main intake chamber 20. The height of the main intake chamber 20 is primarily dictated by the optimum diameter required by the main intake passageways 18 as can best be seen in FIG. 2. It is preferred that the main intake chamber 20 not become excessively high in order that the intake mixture passing through the main intake chamber 20 will pass near the bottom, heated portion thereof.

Figure 3:
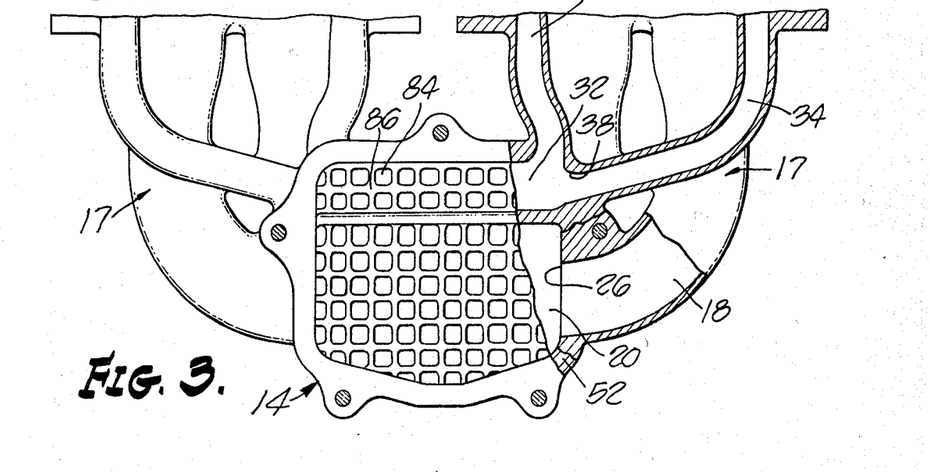
FIG. 3 is a bottom view of the intake manifold of the present invention taken along line 3—3 of FIG. 2, certain parts being shown in section.
Figure 4:
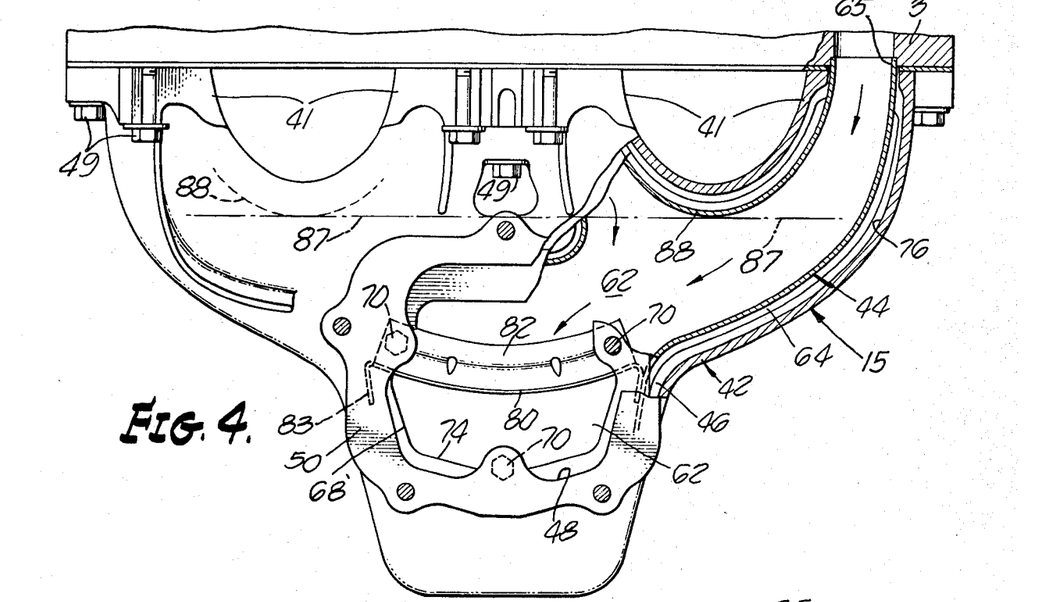
FIG. 4 is a top view of the exhaust manifold of the present invention taken along line 4—4 of FIG. 2, certain parts being shown in section.
Figure 5:
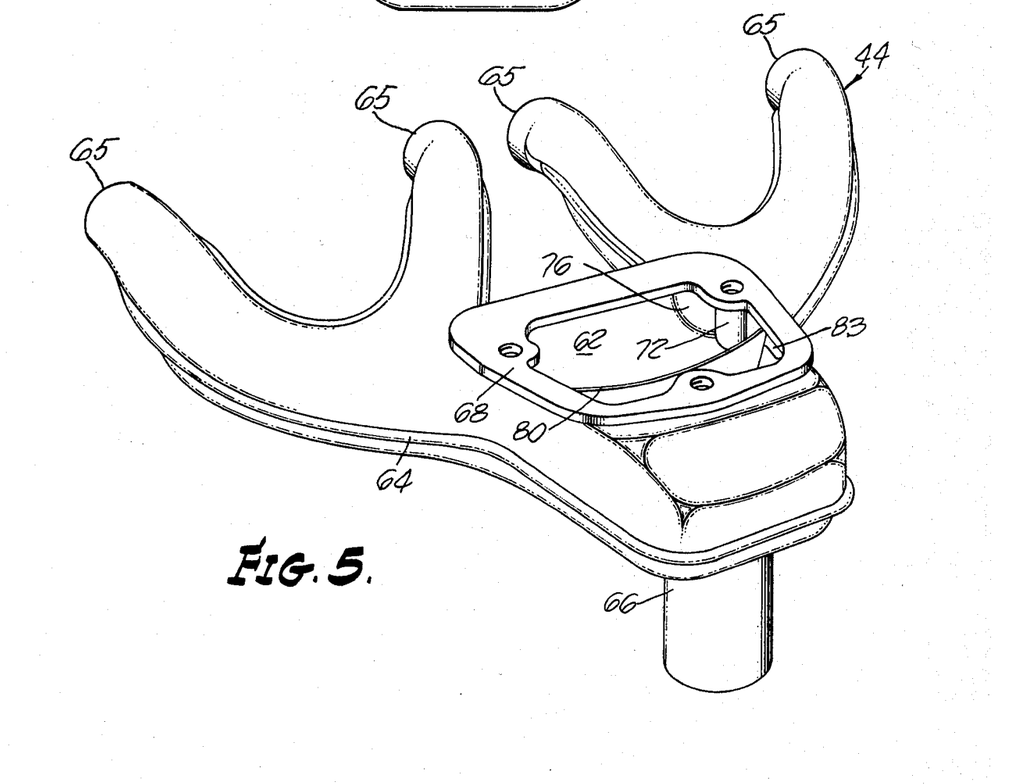
FIG. 5 is a perspective view of the liner of the exhaust manifold.

Adjacent the main intake chamber 20 is an auxiliary intake passage 30 which provides communication between the carburetor assembly 13 and an auxiliary intake chamber 32. The auxiliary intake chamber 32 forms a portion of the auxiliary intake section 16. Auxiliary intake passageways 34 extend from the chamber 32 to the valved passages 4. The auxiliary intake chamber 32 is substantially smaller than the main intake chamber 20 primarily because of the relatively small quantities of rich air-fuel mixture which pass through the auxiliary chamber 32 as compared with the relatively large quantities of lean air-fuel mixture which pass through the main chamber 20. The auxiliary intake chamber 32 is below and to one side of the main intake chamber 20 as can best be seen in FIG. 2. The auxiliary intake chamber 32 extends for the full width of the main intake chamber 20 (see FIG. 3) and is in substantial thermal association therewith. Ports 38 connect the chamber 32 to the passageways 34.

The auxiliary intake section 16 and main intake section 17 therefore operate to receive rich and lean air-fuel mixtures within the intake chambers 32 and 20, respectively. From these intake chambers, passageways lead directly to the various combustion chambers located within the engine head. Four auxiliary intake passageways 34 are provided with the present embodiment. These four auxiliary intake passageways 34 each associate with one auxiliary combustion chamber in the four cylinder engine employed in the present embodiment. The four auxiliary intake passageways 34 are placed in communication with the auxiliary intake chamber 32 by ports 38 located through the sidewall of the auxiliary intake chamber 32. The passageways 34 then extend from the ports 38 to the valved intake ports 4 located within the head 3. The intake manifold 14 structurally terminates at one side of the engine head 3 where a gasket 40 is provided. Passages 4 and 10 within the head 3 then convey the air-fuel mixtures from the interface between the intake manifold 14 and the head 3 to the various combustion chambers 1 and 2.

An exhaust manifold 15 is provided beneath the intake manifold 14. In the present embodiment, this exhaust manifold 15 includes an outer housing or cover 42 which encloses an inner liner 44. The outer cover 42 may, for practical reasons, be a metal casting of cast iron or other similar material. To form the outer cover 42, the liner 44 is first fabricated. Molding material such as sand is then placed around the liner 44 to form the inner shape of the cast cover 42. The cover 42 may then be cast in a conventional manner. Sand relief holes 43 are placed in the casting at convenient locations to remove the sand or other molding material from between the cast cover 42 and the liner 44. Plugs 45 may then be welded into the relief holes 43 to seal the cover 42.

The outer cover 42 provides the main structural support for the exhaust manifold 15 and also functions to retain the heat of the exhaust gases. The outer cover 42 extends from the engine head 3 where it is secured by conventional fasteners 49. From the various valved exhaust passages 11 the arms 41 of the cover 42 extend to a central chamber 46, located directly beneath the main intake chamber 20 and the auxiliary intake chamber 32. A large opening 48 is provided in the flange 50 on the outer cover 42 to allow unobstructed communication between the central chamber 46 and the underside of the main intake chamber 20 and the underside of the auxiliary intake chamber 32.

A mating extension 52 extends downwardly from the intake manifold 14 in alignment with the adapter flange 50 and the mating extension 52 and clamped in position by fasteners 53. A large rigid heat shield 54 is positioned between the adapter flange 50 and the mating extension 52. This heat shield 54 prevents substantial heat transfer by conduction from the exhaust manifold cover 42 to the intake manifold 14 through the mating extension 52. Further, this heat shield 54 prevents direct radiation and convection between the exhaust manifold 14 and the carburetor assemblies 12 and 13 located directly above. The portion of the heat shield which contacts the parts 52 and 50 serves as a gasket.

The exhaust manifold 15 is otherwise separated from the intake manifold 14 in order that substantial quantities of heat are not transferred therebetween. Large amounts of heat transferred to the intake manifold 14 would create overheating of the carburetor assemblies, and a reduction in the heat retention properties of the exhaust manifold 15. The outer cover 42 extends downwardly from the central chamber 46 to meet the exhaust pipe system generally designated 56. The cover 42 is conventionally attached to the exhaust pipe system 56. A seal 58 is positioned between the cover 42 and the exhaust pipe system 56 in a recess 60 provided within an exhaust pipe flange 61 in order that exhaust fumes cannot escape from the system.

The liner 44 contained within the cover 42 is composed of a thin, heat resistant material such as stainless steel. The liner 44 is preferably 2 millimeters or less in thickness to provide low heat capacity. However, if the liner is made too thin, it will wear out too quickly. In the illustrated embodiment, a liner thickness of 1.2 millimeters is employed. The liner 44 extends from the engine head 3 to the exhaust pipe system 56 and provides an exhaust chamber 62. The inner liner is most conveniently formed from two sheets of high temperature resistant stainless steel joined by a flanged seam 64. A third, cylindrical member 66 extends downwardly from the exhaust chamber 62 to meet the exhaust pipe system 56. The seam flange is eliminated near the open ended inlets 65 to the liner 44 adjacent the engine head 3 for convenience of fabrication and assembly.

The thin wall liner 44 is spaced within the thick wall outer cover 42 through a major portion of the outer surface of the liner. As a result, an insulative air gap is provided between the liner 44 and the cover 42. Consequently, the small heat capacity of the liner 44 resulting from the thin walled construction thereof causes the liner to heat up quickly under the influence of the hot exhaust gases without substantial losses to the outer cover 42. The liner 44 is held in contact with the cover 42 at the adapter flange 50. The adapter flange 50 includes a second mating surface on the inside of the cover 42 for receiving the liner 44 and its mounting plate 68 welded thereto. The mounting plate 68 is attached to the adapter flange 50 by means of fasteners 70. Cover nuts 72 are threaded to receive the fasteners 70 and shield the fasteners 70 from corrosion and erosion. The fasteners 70 are positioned in the cover nuts 72 before the cover 42 is cast about the liner 44. Consequently, the fasteners 70 are permanently fixed in the cover nuts 72 to hold the liner 44. A large opening 74 in the liner 44 and mounting plate 68 is aligned with the opening 48 in the adapter flange 50. Thus, a substantial area of communication is provided between the exhaust chamber 62 and the underside of the main and auxiliary intake chambers 20 and 32.

The liner 44 is structurally supported primarily by the fasteners 70 which connect it to the outer cover 42. Some lateral restraint is also provided at the inlets 65 and the outlet 66 of the liner 44. The liner 44 extends through exhaust passageways 76 to each of the exhaust passages 11. At the ends of these passageways 76, the outer cover 42 narrows to receive the inner liner 44. However, a small clearance is provided between the liner inlets and the cover 42. This allows the liner 44 to freely expand or contract relative to the cover 42 because of temperature variations. By fixing the liner 44 at a central location, the maximum displacement due to thermal expansion relative to the cover 42 is minimized. The liner inlets 65 also extend a short way into the head 3 as can best be seen in FIG. 2. This short extension into the head 3 improves the seal between the head 3 and the exhaust manifold 15 and further insures the centering of the liner 44 to minimize disruptions of the flow of exhaust gas from the engine head 3 into the exhaust manifold 15.

Similarly, the cylindrical member 66 extending to the exhaust pipe system 56 is not rigidly fixed to the cover 42 or to the exhaust pipe system 56. The cover 42 is narrowed about the cylindrical member 66. Ring seals 78 are positioned between the cover 42 and the cylindrical member 66 to prevent substantial flow of exhaust gases either into or out of the air space between the liner 44 and the cover 42. The ring seals 78 are positioned so that they fit the inside wall of the recess 77 in the cover and are spaced from the cylindrical member 66. In between these seals 7 are ring seals 79 which fit the outside wall of the cylindrical member 66 but do ot extend to the cover 42. In this way, substantial clearance is allowed in the placement of the cylindrical member 66 relative to the cover 42. This allows for manufacturing tolerances as well as thermal expansion. A snap ring 75 may be used to hold the ring seals 78 and 79 in place. The cylindrical member 66 also extends into the exhaust pipe system 56 to enhance the seal between the exhaust manifold 15 and the exhaust pipe system 56. Further, this extension centers the cylindrical member 66 with respect to the exhaust pipe system 56.

A baffle 80 is provided within the exhaust chamber 62 to direct the moving exhaust gases upward through the openings 78 and 48 to encounter the underside of the main intake chamber 20 and the auxiliary intake chamber 32. The baffle 80 extends upward from the bottom of the exhaust chamber 62 where it is attached at flange 82, to a position near the upper edge of the exhaust chamber 62. The baffle 80 is also attached by tabs 83 to the sides of the liner 44 for rigidity. The baffle 80 is curved in order that the exhaust gases may be directed to the center of the opening 74 as they move upward. The baffle 80 insures that at all load conditions and speeds of the engine, the exhaust gases will pass upwardly to the underside of the intake chambers. The presence of the baffle 80 avoids any channeling effect which might occur at certain flow rates of the exhaust gases. Such channeling would interfere with the passage of the hot gases upwardly to encounter the underside of the chambers 20 and 32. The height of the baffle 80 relative to the underside of the chambers 20 and 32 is to be emperically determined to establish the best results for a given system. When the baffle 80 is too low, the exhaust gases will not properly flow upward to meet the underside of the chambers 20 and 32. In such a case, the air-fuel mixtures passing through the chambers 20 and 32 would not be sufficiently warmed. When the baffle 80 is too high, the exhaust gases will overheat the chambers 20 and 32 and the air-fuel mixtures therein. Further, the baffle 80 restricts the passage of exhaust gases through the exhaust chamber 62. When the baffle 80 is too large, the chamber 62 is excessively restricted and detrimental back pressure will result within the system. In the present embodiment, the top of the baffle 80 is approximately 2.5 centimeters below the underside of the main intake chamber 20.

To receive the upwardly moving exhaust gases deflected by the baffle 80, a riser member 84 is provided. The underside of the auxiliary and main intake chambers is formed into a riser member 84, which extends in continuous fashion and without interruption across the underside of both of the main and auxiliary combustion chambers 20 and 32. The riser member 84 operates to divide the main and auxiliary intake chambers 20 and 32 from the exhaust chamber 62 and yet provide thermal communication therebetween. It thus provides a wall common to the intake system and the exhaust system. The riser member 84 is cast integrally with the remainder of the intake manifold 14 and is therefore of the same material; cast aluminum is employed in this embodiment. The underside of the riser member 84 includes two mutually perpendicular series of ridges 86 which extend both across and lengthwise under the intake chambers 20 and 32. These ridges 86 prevent buckling of the riser member 84 under the substantial thermal stresses encountered during operation of the system. The uniform minimum wall thickness of the riser member between the ridges 86 has been selected in this embodiment to be 4 millimeters. This thickness provides minimum warmup time and, at the same time, sufficient strength for long life.

The riser member 84 is of unitary construction using the same material across both the underside of the main intake chamber 20 and the auxiliary intake chamber 32 in order that the conditions encountered by each of these chambers 20 and 32 will vary together. Consequently, when the exhaust from the engine is relatively cool, both the main intake chamber 20 and the auxiliary intake chamber 32 will experience similar, relatively low level amounts of heat being transferred through the riser 84. On the other hand, when the exhaust is relatively hot and is passing quickly through the exhaust manifold, the two chambers will experience similar high levels of heat transfer. As a result of this relationship, the variable parameters such as the air-fuel ratios are not required to be changed to accommodate the range of operating conditions. The main intake system will remain in tune with respect to the auxiliary intake system under all operating conditions. The unitary construction of the riser member 84 also acts to improve the life of the system. Through the use of a single part, the repeated thermal stresses are substantially reduced which results in greater fatigue life for the riser member 84. As a further consideration, the total relative quantities of heat being transmitted to each of the two chambers 20 and 32 preferably should not be the same. The auxiliary intake system does not handle the quantity of intake mixture handled by the main intake system. Consequently, less heat is required to obtain the same results with the auxiliary intake system than is required with the main intake system. The ratio of lateral area of the riser member 84 in direct association with the auxiliary intake chamber 32, as compared to the lateral area of the riser member 84 directly associated with the main intake chamber 20, is chosen to accommodate the difference in heat requirements. The lateral area is defined by the horizontal portions of the riser member 84 and does not include the vertical sections either at the edge of the riser member 84 or along the side of the auxiliary intake chamber 32. It has been found that the portion of the lateral surface area of the riser member 84 associated with the auxiliary intake chamber 32 should be from 0.2 to 0.4 of the total surface area of the riser member associated with both intake chambers 20 and 32. In this way, the riser member temperature remains constant across both the underside of the auxiliary intake chamber 32 and the underside of the main intake chamber 20. By maintaining the proportions of the riser member 84 within the stated range, the relative temperature conditions of the riser member 84 between the main and auxiliary chambers remain substantially constant following cold start to fully steady power. Again, this proportioning of the riser areas eliminates the need to vary the carburetor settings and the like, with variations in the operating conditions of the system.

The placement of the auxiliary chamber 32 below the main chamber 20 also affects the relative amounts of heat transmitted to the chambers. The riser surface associated with the auxiliary chamber 32 is positioned approximately 1.5 centimeters below the riser surface associated with the main intake chamber 20. Also, the position of the top of the baffle 80 below the riser member 84 affects the amount of heat transmitted to each of the chambers 20 and 32. In the present embodiment, the vertical surface between the two lateral surfaces of the riser member 84 is laterally spaced from the top center of the baffle 80 approximately 3.75 to 4.0 centimeters.

THe baffle 80, the orientation and configuration of the riser member 84, and the relative placement of the main and auxiliary intake chambers 20 and 32 therefore cooperate to establish substantially constant heat conditions between the main and auxiliary intake chambers 20 and 32 in spite of variations in exhaust gas temperature and flow rate. These configurations also cooperate to create a steady state temperature condition in the riser member 84. Once the manifold system has heated up after cold start, the riser member 84 approaches a constant temperature around 200° C. It has been found desirable to maintain the temperature of the riser member 84 for both the main intake chamber 20 and the auxiliary intake chamber 32 between the temperatures of 160° and 260° C. Within this temperature range, the fuel within the air-fuel mixtures is assured of being vaporized by the time it is ignited within the combustion chambers. Further, if the temperature of the riser member is too hot, the fuel in the auxiliary intake passageway may be carbonized prematurely. Also, the carburetor may become overheated by virtue of its association with the overheated intake manifold resulting in vaporlock and hard hot start. The maintenance of the temperature of the riser member within a small range during operation of the engine also aids longevity of the riser member.

This range of temperatures is maintained as a steady state condition over a wide range of operating conditions once the engine has warmed from the cold start condition. When the exhaust gases are relatively hot and a high volume of flow is experienced, more heat is transmitted to the riser member 84. However, at the same time, the quantity of cool air-fuel mixture passing through both the main intake chamber 20 and the auxiliary chamber 32 is increased. Consequently, more heat is supplied to the riser member 84 by the exhaust gases and more heat is removed from the upper side of the riser member 84 by the air-fuel mixtures. The present configuration has been developed to achieve a balance between the heat supplied to the riser member 84 and the heat withdrawn from the riser member 84 so that this range of desired temperature of the riser 84 can be maintained across the wide range of engine operating conditions.

The exhaust chamber 62 provides yet a second function as a control of the thermal conditions of the exhaust gases. The exhaust gases being discharged from the main combustion chambers remain at a temperature above the temperature necessary to continue combustion of unburned HC and oxidation of CO, which unwanted constituents are still present in the exhaust gases. Further, the combined rich air-fuel mixture and lean air-fuel mixture constitute an overall mixture leaner than stoichiometric, resulting in significant quantities of excess oxygen in the exhaust gases. Consequently, the excess oxygen in association with the HC and CO at a temperature above the temperature wherein combustion and oxidation of these compounds is sustained results in the continuing conversion of the unwanted constitutents to $H_2O$ and $CO_2$.

In order that a maximum amount of HC and CO might be converted to water and carbon dioxide, it is of benefit to retain the exhaust gases at this elevated temperature as they pass through the exhaust manifold. The air space insulation between the exhaust manifold cover 42 and the liner 44 promotes this condition wherein the temperature of the exhaust gases is not only maintained but continues to rise due to the continuing exothermic reaction of the components. It has been found beneficial to control the relative volume of the exhaust chamber 62 relative to the displacement of the engine in order that this process may be optimized to provide a maximum conversion of the pollutants HC and CO to $H_2O$ and $CO_2$. When the size of the exhaust chamber 62 is excessive, it is difficult to control temperatures both within the liner 44 and at the riser member 84. Further it takes an exceptionally long period of time for the exhaust manifold 15 to properly warmup. When the size of the exhaust chamber 62 is too small, the exhaust gases pass through the chamber 62 and into the exhaust pipe system 56 before the HC and CO can be substantially burned and oxidized. The size of the exhaust chamber 62 is defined as being the interior volume of the liner 44 from a vertical plane 87 tangent to the convex inner surfaces 88 of the liner 44 to the inlet opening 89 into the cylindrical member 66. The exhaust chamber volume is further defined as ending at a plane coincident with the under surface of the mounting plate 68. It has been determined that it is preferably that the ratio of the main exhaust chamber volume to the engine displacement be within the range of 0.5 to 0.9. Within this range, the conditions within the exhaust manifold can be controlled and the exhaust is substantially free of HC and CO pollutants.

It is desirable not only that the exhaust be relatively free of polluting compounds after a steady state engine condition is obtained, but is is also important that such a steady state condition be reached relatively quickly. Tests of an engine of the present embodiment have indicated that acceptable emission levels can be achieved in less than 1 minute following a cold start. This rapid warmup time is made possible by the combination of several features which also operate to maintain the steady state performance of the manifold system. Specifically, the exhaust manifold 15 is designed to present a minimum heat capacity to the entering exhaust gases, so that the manifold is quickly heated to provide proper conditions for the continuing combustion of the HC and oxidation of CO. Because of the thin wall thickness and small size of the liner 44, these conditions can be quickly met. Further, the exhaust gases are directed by the baffle 80 upward to insure proper contact of the hot exhaust gases with the underside of the riser member 84. The relative position of the auxiliary chamber 32 extending into the exhaust manifold promotes early warmup of the rich air-fule mixture passing therethrough. However, the ability of the system to maintain a constant temperature across the riser member during sustained operation is not affected. The riser 84 is also of aluminum and is of minimum wall thickness to promote rapid heat transfer therethrough. Consequently, the manifold system cooperates to quickly provide, following a cold start, the proper thermal conditions within the exhaust liner 44 and at the riser 84 for transfer to the intake mixtures.

Thus, a manifold system is provided which functions in cooperation with an engine of the type having an auxiliary combustion chamber associated with each main combustion chamber and its associated carburetion system to substantially reduce the amount of pollutants being released to the air by automobile engines. The manifold system responds quickly to provide advantageous preconditioning of the intake mixtures and maintains proper conditions for continued combustion of HC and oxidation of CO within the exhaust gases.

Having fully described the preferred embodiment of the present invention, it is to be understood that the invention is not to be limited to the details herein set forth but is of the full scope of the appended claims.

We claim:

1. A manifold system for an internal combustion piston engine of the type having an auxiliary combustion chamber associated with each main combustion chamber and connected thereto by a torch nozzle, the manifold system comprising, in combination: an intake manifold including a main intake chamber and a main intake passageway extending from said main intake chamber to the engine and adapted to deliver a lean air-fuel mixture for the main combustion chambers, said intake manifold also including an auxiliary intake chamber and an auxiliary intake passageway extending from said auxiliary intake chamber to the engine and adapted to deliver a rich air-fuel mixture for the auxiliary combustion chambers, an exhaust manifold comprising a thin wall metal liner enveloped by and spaced within a thick wall metal outer cover, said liner having an exhaust passageway adapted for collecting exhaust gases from the engine and having an exhaust chamber connected to each exhaust passageway, said exhaust manifold having an opening, and a riser member forming a part of said intake manifold and associated with said opening to transfer heat to the exhaust gases to the intake mixtures in the main intake chamber and the auxiliary intake chamber to insure vaporization of both mixtures, the riser member having a first portion of small area adjacent to the auxiliary intake chamber and a second portion of large area adjacent the main intake chamber, said first portion having an effective area of 0.2 to 0.4 of the total surface of the riser member associated with both intake chambers.

2. The combination set forth in claim 1 in which the liner is formed of stainless steel, and has an opening aligned with an opening in the outer cover through which exhaust gases may pass to heat the intake mixtures in said riser member.

3. A manifold system for an internal combustion piston engine of the type having an auxiliary combustion chamber associated with each main combustion chamber and connected thereto by a torch nozzle, the manifold system comprising, in combination: an intake manifold including a main intake chamber and a main intake passageway extending from said main intake chamber to the engine and adapted to deliver a lean air-fuel mixture for the main combustion chambers, said intake manifold also including an auxiliary intake chamber and an auxiliary intake passageway extending from said auxiliary intake chamber to the engine and adapted to deliver a rich air-fuel mixture for the auxiliary combustion chambers, an exhaust manifold comprising a thin wall stainless steel liner enveloped by an spaced within a thick wall metal casting forming an outer cover, said liner having an exhaust passageway adapted for collecting exhause gases from the engine and having an exhaust chamber connected to each exhaust passageway, said exhaust manifold chamber having an opening, and a riser member forming a part of said intake manifold and associated with said opening to transfer heat of the exhaust gases to the intake mixtures in the main intake chamber and the auxiliary intake chamber to insure vaporization of both mixtures, the liner wall being not more than about two millimeters thick.

4. The combination set forth in claim 3 in which the liner wall is about 1.2 millimeters thick.

5. In combination, an internal combustion piston engine of the type having an auxiliary combustion chamber associated with each main combustion chamber and connected thereto by a torch nozzle, an intake manifold including a main intake chamber and a main intake passageway extending from said main intake chamber to the engine to deliver a lean air-fuel mixture to each main combustion chamber, said intake manifold also including an auxiliary intake chamber and an auxiliary intake passageway extending from said auxiliary intake chamber to the engine to deliver a rich air-fuel mixture to each auxiliary combustion chamber, an exhaust manifold comprising a thin wall stainless steel liner enveloped by and spaced within a thick wall metal casting forming an outer cover, said liner having an exhaust passageway for collecting exhaust gases from each main combustion chamber and having an exhaust manifold chamber connected to each exhaust passageway, the volume of said exhaust manifold chamber being from 0.5 to 0.9 times the displacement of the engine, said exhaust manifold chamber having an opening, and a riser member forming a part of said intake manifold and associated with said opening to transfer heat of the exhaust gases to the intake mixtures in the main intake chamber and the auxiliary intake chamber to insure vaporization of both mixtures.

* * * * *

UNITED STATES PATENT AND TRADEMARK OFFICE
CERTIFICATE OF CORRECTION

PATENT NO. : 3,994,270
DATED : November 30, 1976
INVENTOR(S) : Soichi Nakano et al It is certified that error appears in the above-identified patent and that said Letters Patent are hereby corrected as shown below:

Column 1, line 5, "Akiro" should read --Akira--

Column 4, line 28, "passage 1" should read --passage 10--

Column 7, line 7, "scals" should read --seals--

Column 7, line 14, "seals 7" should read --seals 78--

Column 7, line 15, "ot" should read --not--

Column 7, line 29, "openings 78" should read --openings 74--

Column 9, line 20, "THe" should read --The--

Column 10, line 40, "preferably" should read --preferable--

Column 10, line 67, "fule" should read --fuel--

Claim 3, line 17, "an" at end of line should read --and--

Claim 3, line 20, "exhause" should read --exhaust--

Signed and Sealed this

Fifteenth Day of February 1977

[SEAL]

Attest:

RUTH C. MASON
Attesting Officer

C. MARSHALL DANN
Commissioner of Patents and Trademarks